(12) United States Patent
Carapelli

(10) Patent No.: US 8,381,597 B2
(45) Date of Patent: Feb. 26, 2013

(54) INFERENTIAL FLOW METER FOR USE IN FUEL DISPENSING ENVIRONMENTS

(75) Inventor: Giovanni Carapelli, Florence (IT)

(73) Assignee: Gilbarco, S.R.L., Florence (IT)

( * ) Notice: Subject to any disclaimer, the term of this patent is extended or adjusted under 35 U.S.C. 154(b) by 1017 days.

(21) Appl. No.: 12/404,677

(22) Filed: Mar. 16, 2009

(65) Prior Publication Data

US 2010/0230437 A1     Sep. 16, 2010

(51) Int. Cl.
*G01F 1/86* (2006.01)
(52) U.S. Cl. ..................................... 73/861.01
(58) Field of Classification Search ............... 73/861.79, 73/861.84, 861.78; 415/186; 222/71, 75; 364/528.17
See application file for complete search history.

(56) References Cited

U.S. PATENT DOCUMENTS

| | | | |
|---|---|---|---|
| 3,842,655 A * | 10/1974 | Schlatter et al. | 73/32 R |
| 5,867,403 A * | 2/1999 | Sasnett, Jr. et al. | 700/282 |
| 6,119,110 A | 9/2000 | Carapelli | |
| 6,149,033 A * | 11/2000 | Poleshuk | 222/75 |
| 6,692,535 B2 | 2/2004 | Olivier | |
| 6,830,080 B2 * | 12/2004 | Nanaji | 141/59 |
| 6,854,342 B2 | 2/2005 | Payne et al. | |
| 6,935,191 B2 | 8/2005 | Olivier et al. | |
| 6,996,485 B2 | 2/2006 | Payne | |
| 7,028,561 B2 | 4/2006 | Robertson et al. | |
| 7,219,560 B1 | 5/2007 | Olivier et al. | |
| 8,096,446 B2 * | 1/2012 | Carapelli | 222/91 |

* cited by examiner

*Primary Examiner* — Jewel V Thompson
(74) *Attorney, Agent, or Firm* — Nelson Mullins Riley & Scarborough LLP

(57) ABSTRACT

An apparatus and method for measuring fluid flow comprising an inferential flow meter having a housing defining a fluid flow path. A pulser is operative to produce an output signal indicative of flow rate through the meter. The apparatus further includes a controller in electronic communication with the pulser so as to receive the output signal. Based on the output signal, the controller is operative to determine fluid flow in a plurality of dynamic time sub-windows corresponding to respective periods of substantially consistent instantaneous flow.

21 Claims, 6 Drawing Sheets

INFERENTIAL FLOW METER FOR USE IN FUEL DISPENSING ENVIRONMENTS

BACKGROUND OF THE INVENTION

The present invention relates generally to flow meters for use in fuel dispensing environments. More particularly, the invention relates to an inferential flow meter adapted to have enhanced accuracy when pulsations occur in the flow.

Inferential flow meters, e.g., a turbine flow meter, may be used in a variety of applications in fuel dispensing environments. For example, turbine flow meters are often used to meter fuel being dispensed, measure the vapor being returned to the underground storage tank in a stage two vapor recovery fuel dispenser, or measure the vapor or air released to atmosphere from the ullage area of an underground storage tank when a pressure relief valve in a vent stack is opened to relieve pressure.

Turbine flow meters generally comprise a housing having inlet and outlet ports at respective ends thereof. A shaft is located inside the housing along the housing's longitudinal axis. One or more turbine rotors mounted on the shaft rotate when fluid (liquid or gas) flows through the housing via the inlet and outlet ports. A detector is typically mounted to the housing to detect rotation of one or both of the rotors. For example, the detector may be a hall effect device or pickup coil that determines rotation based on changes in a magnetic field. The detector is associated with a "pulser" that produces a series of pulses at a rate which is related to the flow rate of fluid through the meter. As such, the flow rate of the fluid flowing through the housing can be determined.

Various events—such as the operation of submersible turbine pump (STP) motors, the operation of valves in the fuel flow path, or nozzle snaps—can cause substantial flow pulsations. Nozzle snaps, for example, occur when the nozzle is suddenly closed by the customer, or by a valve within the nozzle that automatically closes when the customer's fuel tank is full. These flow pulsations create transients that flow back and forth quickly through the entire hydraulic system for a few seconds. As the pulsations travel through the meter, the instantaneous speed of the turbine rotor(s) varies momentarily in response to the fluid perturbation.

Meters known in the art calculate fluid flow rates based on counting the number of pulses during a programmable time window. The number of pulses is divided by the time window to derive pulses per unit of time. Calculating an average in this manner filters out instantaneous speed variations. As a result, errors in viscosity calculation and flow rate can occur.

Various turbine meters of the prior art are shown and described in U.S. Pat. Nos. 7,028,561, 6,854,342, 6,692,535 and 5,689,071. Each of these patents is incorporated herein by reference in its entirety.

Those skilled in the art will appreciate the scope of the present invention and realize additional aspects thereof after reading the following detailed description of the preferred embodiments in association with the accompanying drawing figures.

SUMMARY OF THE INVENTION

According to one aspect, the present invention provides an apparatus for measuring fluid flow comprising an inferential flow meter having a housing defining a fluid flow path. A pulser is operative to produce an output signal indicative of flow rate through the meter. The apparatus further includes a controller in electronic communication with the pulser so as to receive the output signal. Based on the output signal, the controller is operative to determine fluid flow in a plurality of dynamic time sub-windows corresponding to respective periods of substantially consistent instantaneous flow.

In many exemplary embodiments, the output signal of the pulser comprises a pulse train in which pulse frequency varies with instantaneous flow. The dynamic time sub-windows may thus be ascertained by comparing duration between adjacent pulses. For example, the controller may be operative to include a series of adjacent pulses in one of the dynamic time sub-windows if respective durations therebetween are within a threshold of each other. Preferably, the controller may calculate a total delivered volume within a longer time period by determining and summing together partial delivered volume during respective dynamic time sub-windows making up the longer time period.

Another aspect of the present invention provides an apparatus for measuring fluid flow comprising a turbine flow meter having a rotor. A pulser is operative to produce a pulse train in which pulse rate varies with instantaneous flow through the turbine flow meter. A controller operative to determine a total volume of fluid passing through the turbine flow meter during a time period is also provided.

The controller is configured to perform the steps of: (a) determining a first partial volume based on a first pulse rate during a first time sub-window; (b) determining a second partial volume based on a second pulse rate during a second time sub-window; and (c) adding the first partial volume and the second partial volume. Preferably, the first and second time sub-windows may be dynamically determined corresponding to respective periods in which the first and second pulse rates remain substantially consistent. For example, substantial consistency may be determined by ascertaining whether the first and second pulse rates remain consistent within a predetermined threshold during the first and second time sub-windows, respectively. Pulse rates within each of the time sub-windows may be averaged during determination of the first and second partial volumes to filter out spurious variations.

According to another aspect, the present invention provides a method of determining flow of a fluid through an inferential flow meter. One step of the method involves detecting a pulse train having a plurality of pulses occurring at a pulse rate indicative of fluid flow rate through the inferential flow meter. Pulse rates of the plurality of pulses are determined. Another step of the method involves grouping adjacent pulses having substantially consistent pulse rates into a plurality of time sub-windows. Respective partial volumes for each of the time sub-windows are also determined. The respective partial volumes are added to determine a total delivered volume.

A further aspect of the present invention provides a fuel dispenser comprising a fluid flow conduit for delivering fuel from a storage tank. A hose having a proximal end and a distal end is also provided. The proximal end of the hose is in fluid communication with the fluid flow conduit. A nozzle is connected to the distal end of the hose. An inferential flow meter is located in line with the fluid flow conduit. A pulser associated with the inferential flow meter produces an output signal indicative of flow rate through the inferential flow meter.

The fuel dispenser further comprises a controller in electronic communication with the pulser so as to receive the output signal. Based on the output signal, the controller is operative to determine fluid flow in a plurality of dynamic time sub-windows corresponding to respective periods of substantially consistent instantaneous flow.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
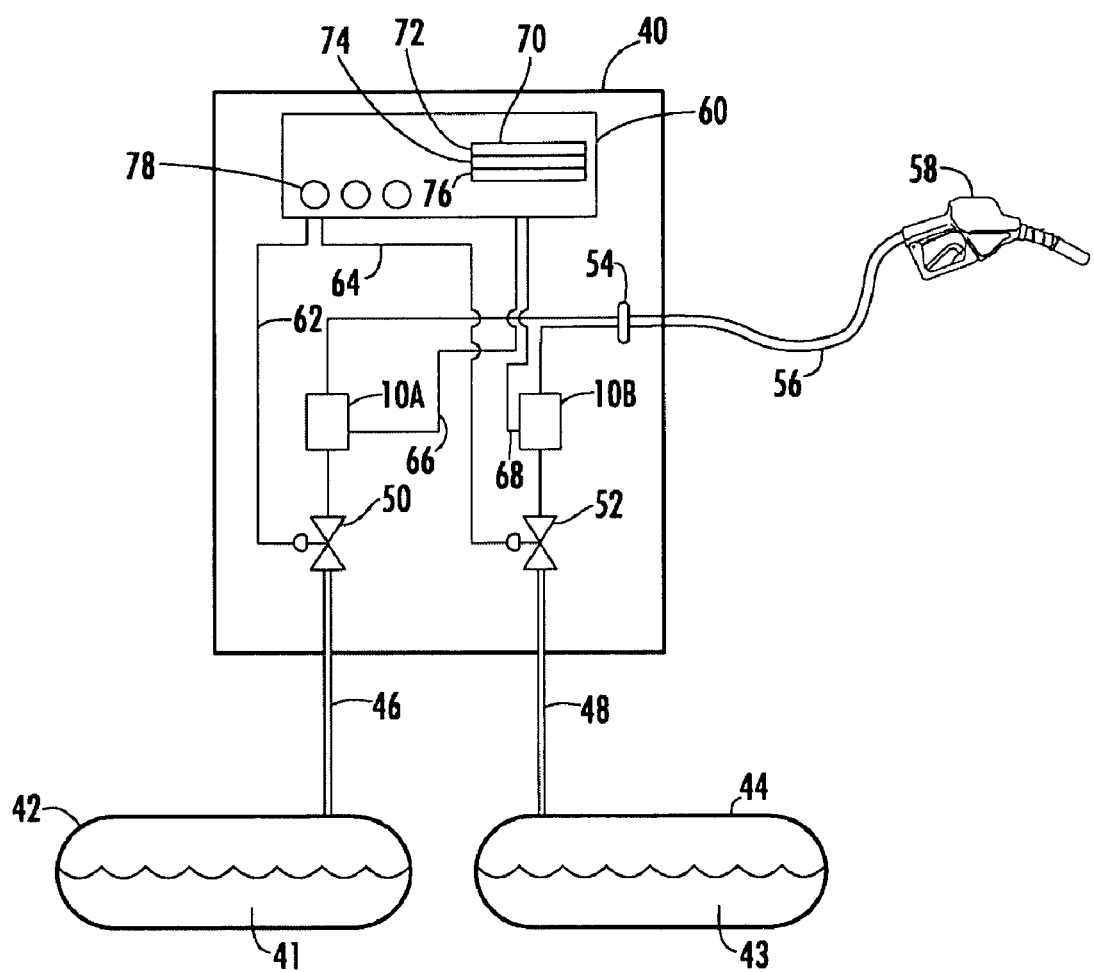
FIG. 1 is a schematic diagram of a fuel dispenser for fueling vehicles that may utilize one or more turbine flow meter constructed in accordance with the present invention.

Repeat use of reference characters in the present specification and drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

FIG. 1 illustrates a pair of turbine flow meters 10A and 10B utilized in a fuel dispenser 40. As is well-known, a fuel dispenser such as fuel dispenser 40 is used to dispense and measure the amount of fuel being delivered to a vehicle (not shown). Accurate meters are required to measure fuel dispensing to comply with Weights & Measures regulatory requirements.

Fuel dispenser 40 may be a blending type fuel dispenser wherein a low-octane fuel 41 stored in a low-octane underground storage tank (UST) 42 and a high-octane fuel 43 stored in a high-octane underground storage tank (UST) 44 are blended together by fuel dispenser 40 to deliver either a low-octane fuel 41, high-octane fuel 43, or a mixture of both to a vehicle. Low-octane fuel 41 is supplied to fuel dispenser 40 through a low-octane fuel supply conduit 46. Likewise, high-octane fuel 43 is delivered to fuel dispenser 40 through a high-octane fuel supply conduit 48. Both low-octane fuel 41 and high-octane fuel 43 pass through fuel dispenser 40 in their own independent flow paths. Each fuel 41, 43 encounters a valve 50, 52 that controls whether the fuel is allowed to enter into fuel dispenser 40, and if so at what flow rate.

As either low-octane fuel 41, high-octane fuel 43, or both pass through their respective turbine meters 10A, 10B, the fuels come together in the blend manifold 54 to be delivered through a hose 56 and nozzle 58 into the vehicle. Valves 50, 52 may be proportionally controlled and may be under the control of a controller 60 in fuel dispenser 40 via control lines 62, 64. U.S. Pat. No. 4,876,653 entitled "Programmable Multiple Blender," incorporated herein by reference in its entirety, describes a system for blending low and high octane fuels.

Controller 60 determines when a fueling operation is allowed to begin. Typically, a customer is required to push a start button 78 and to indicate which grade of fuel 41, 43 is desired. Controller 60 thereafter controls valves 50, 52 to allow low-octane fuel 41 or high-octane fuel 43 to be dispensed, depending on the type of fuel selected by the customer.

After fuel 41, 43 passes through both valves 50, 52, it flows through the associated one of turbine meters 10A, 10B. If only a low-octane fuel 41 or high-octane fuel 43 was selected by the customer to be dispensed, controller 60 would only open one of the valves 50, 52. As fuels 41, 43 flow through turbine meters 10A, 10B, the respective pulsers will produce a corresponding pulser signal 66, 68 that is input into controller 60.

Controller 60 determines the quantity of flow of fuel flowing through turbine meters 10A, 10B for the purpose of determining the amount to charge the customer. In this regard, controller 60 uses the data from the pulser signals 66, 68 to generate a totals display 70. Totals display 70 includes an amount to be charged to the customer display 72, gallons (or liters) dispensed display 74 and the price per unit of fuel display 76. As one skilled in the art will appreciate, controller 60 may be implemented in various combinations of hardware, firmware, or software, as necessary or appropriate.

In other embodiments, a turbine meter of the present invention may be used in a vent stack of an underground storage tank at a service station. Specifically, it may be desirable to measure the amount of air flowing through a vent stack using meter 10 to determine how often and how much air is separated by a membrane and released to atmosphere for any number of diagnostic or information purposes. The membrane may either permeate hydrocarbons or permeate oxygen or air as disclosed in U.S. Pat. Nos. 5,464,466 and 5,985,002, incorporated herein by reference in their entirety. In other embodiments, meter 10 may measure the amount of vapor being returned to the underground storage tank in a stage two vapor recovery system.

Figure 2:
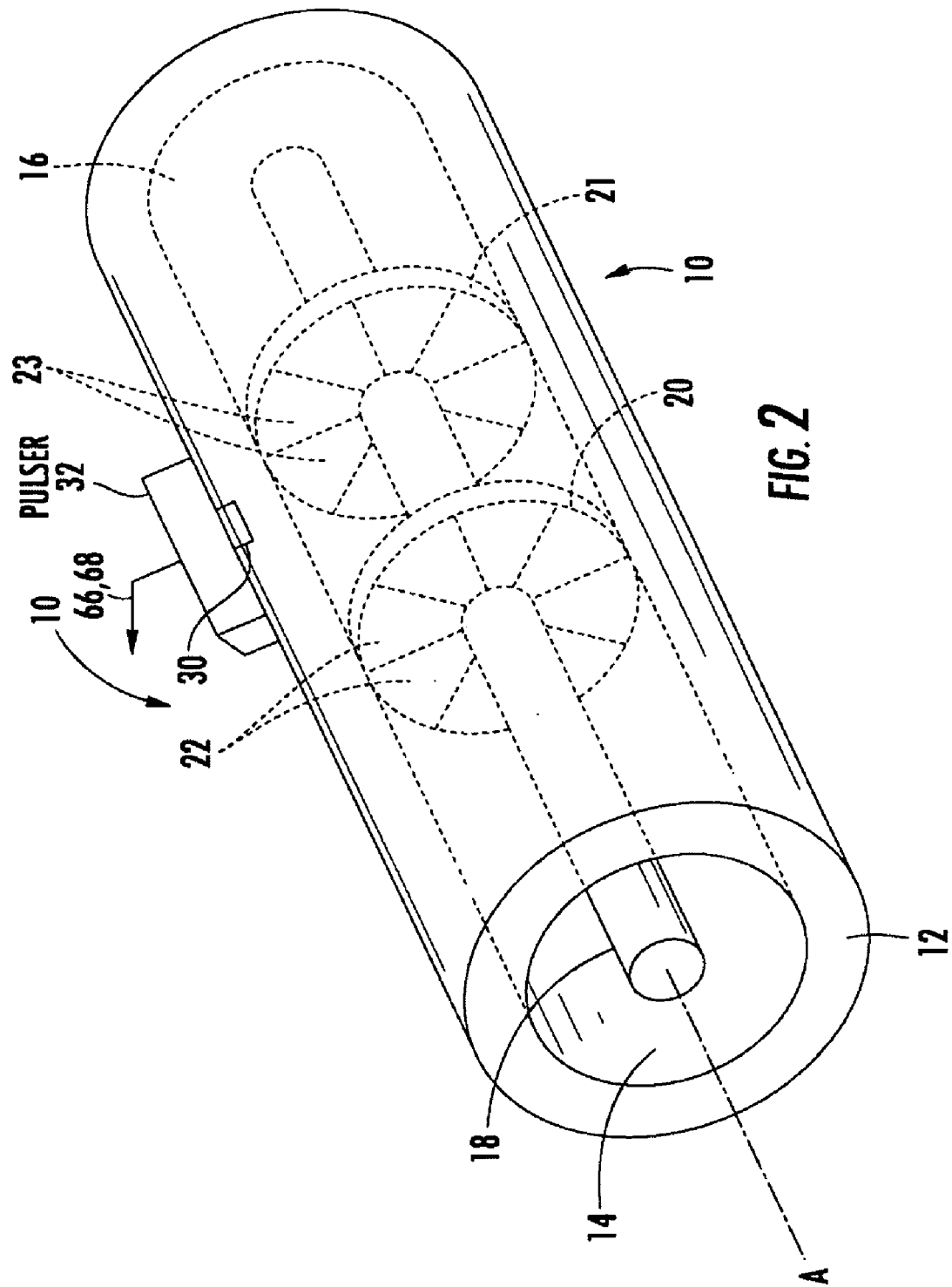
FIG. 2 is a diagrammatic perspective view of a turbine flow meter constructed in accordance with an embodiment of the present invention.

FIG. 2 illustrates a turbine flow meter 10 constructed in accordance with an embodiment of the present invention. Meter 10 includes a housing 12 that forms an inlet port 14 and an outlet port 16 for ingress and egress of fluid (liquid or gas), respectively. A shaft 18 or other support structure is located inside of housing 12 along a central axis A. In this embodiment, a pair of turbine rotors 20 and 21 that rotate in a plane perpendicular to axis A are located at selected axial positions on shaft 18. For example, shaft 18 may be stationary but supports rotors 20 and 21 for rotation. Generally, a bearing set will be interposed between each of the rotors and the shaft 18 to facilitate the respective rotor's rotation.

Figure 3:
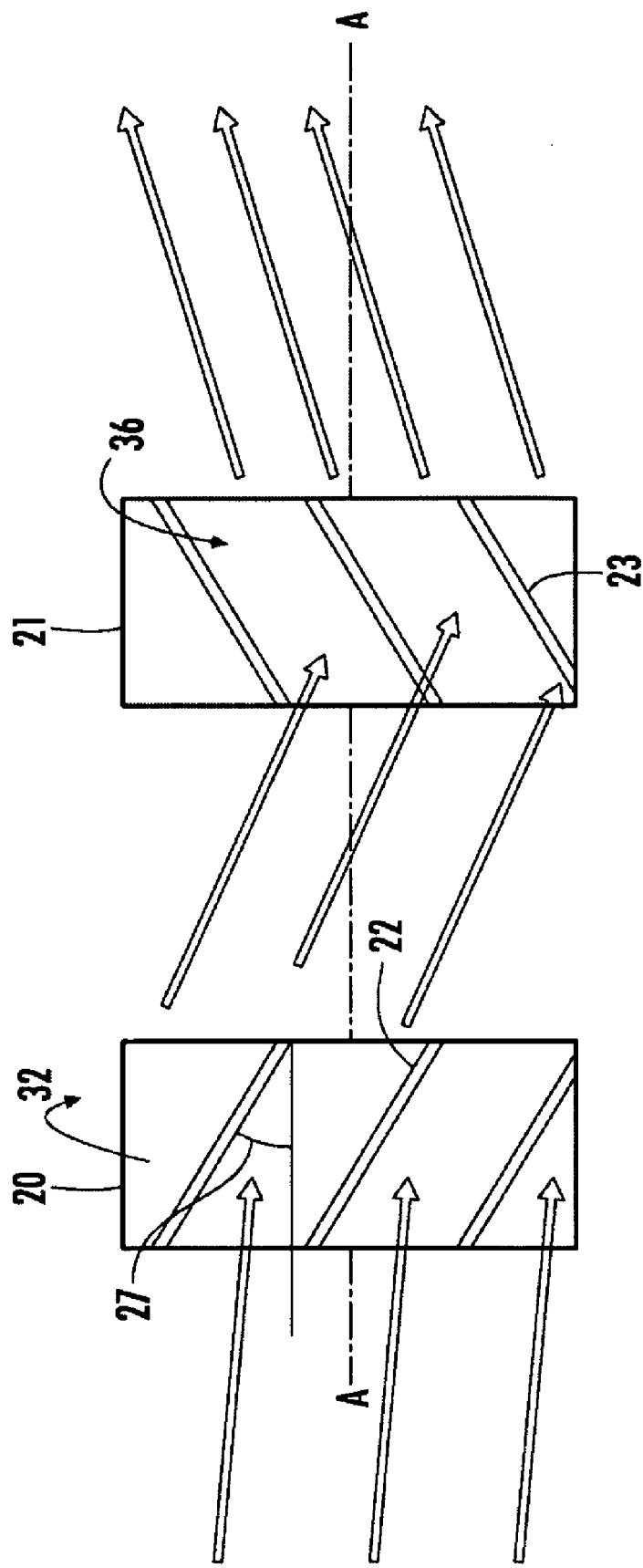
FIG. 3 is an illustration of a flow pattern of a turbine flow meter constructed in accordance with the embodiment of FIG. 2.

Referring now also to FIG. 3, rotor 20 is located slightly upstream of rotor 21, and serves to condition the flow to rotor 21. In particular, rotor 20 includes one or more vanes 22 (also known as blades) that cause rotation when impinged by the flowing fluid. Similarly, rotor 21 includes one or more vanes 23. Vanes 22 and 23 are preferably spaced evenly around the periphery of the respective rotor hub. In addition, vanes 22 of rotor 20 are preferably canted oppositely from vanes 23 of rotor 21. This orientation of vanes 22 and 23 causes the two rotors to rotate in opposite directions (shown by arrows 32 and 36) at a rotational speed indicative of the fluid flow rate.

Because vanes 22 are canted, the straight fluid flow is converted into a generally swirling pattern with an angular trajectory based on angle 27 of vanes 22. This angular trajectory is generally oblique to the longitudinal axis of meter 10

(shown as "A"). After passing through rotor 20, the fluid impinges vanes 23 of rotor 21. The angular trajectory of the flow due to rotor 20 increases the material's angle of incidence with vanes 23. As a result, the driving force used to impart rotational movement on turbine rotor 21 also increases. This facilitates rotation of rotor 21 at lower flow rates than may otherwise be the case.

As can be seen in FIG. 2, a detector 30 is located on housing 12 adjacent to rotor 21. The output of detector 30 is provided to a pulser 32 which produces a serial pulse train used by the controller to determine flow rate and thus amount of fluid dispensed. Any suitable detector may be utilized, such as a magnetic detector. Examples of typical magnetic detectors that have been used in turbine flow meters are pickup coils and hall effect sensors. In either case, rotation of rotor 21 produces a characteristic signal which is used to generate the pulse train output of pulser 32. As one skilled in the art will appreciate, housing 12 should be formed of a nonmagnetic material if a magnetic sensor is used. In contrast, rotor 21 should be formed wholly or partly of a magnetic material. While detector 30 is shown adjacent to rotor 21 in this case, embodiments are contemplated in which the detector is located adjacent to a separate encoder wheel which rotates with the rotor.

Figure 4:
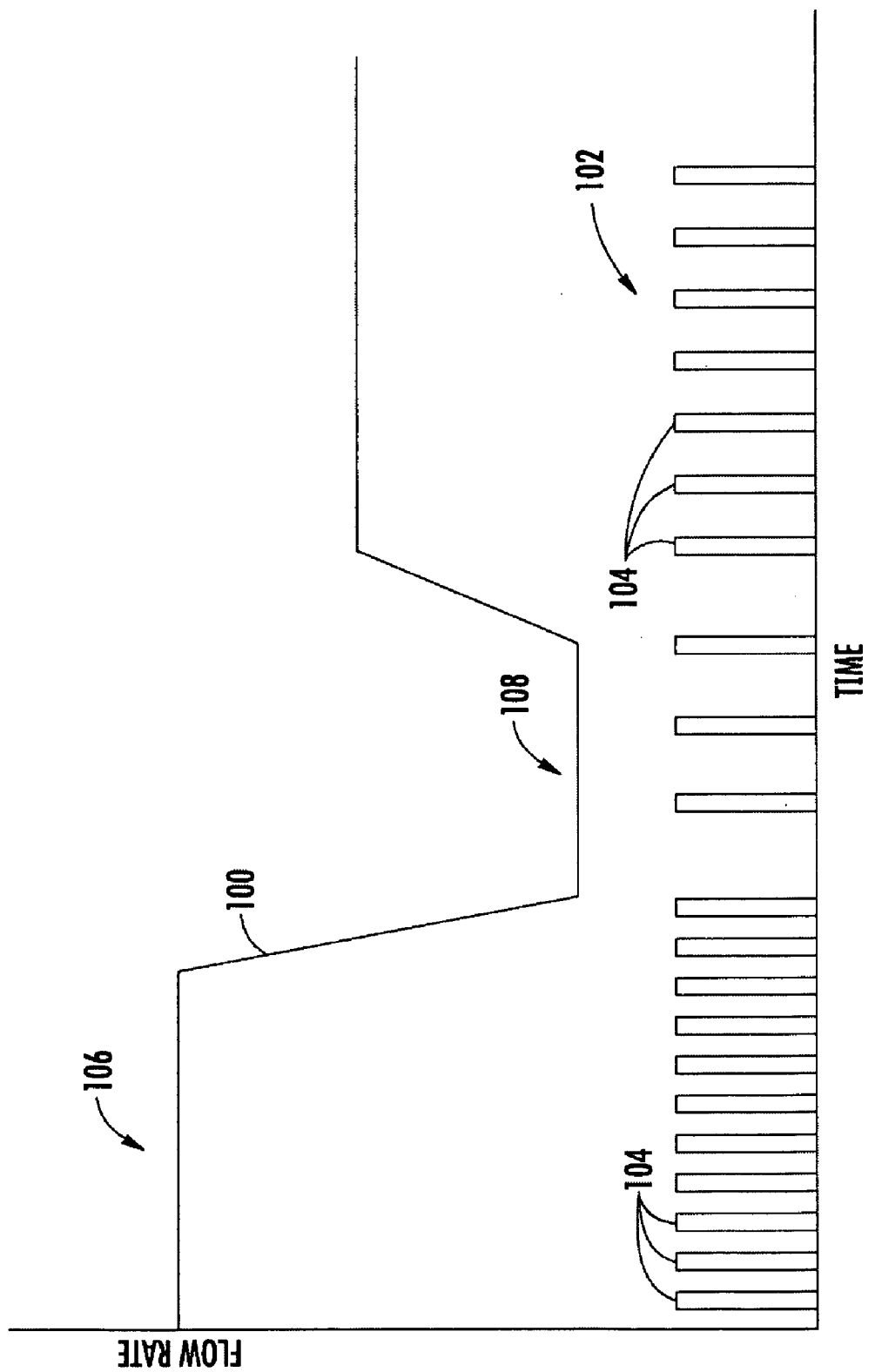
FIG. 4 is a graph illustrating a pulse train output by a turbine flow meter during the presence of flow pulsations and the corresponding fluid flow rate.

FIG. 4 shows the relationship between flow rate 100 and the frequency of pulses produced by pulser 32. In this regard, pulser 32 produces a pulse train 102 comprised of individual pulses 104 will be output from pulser 32. As can be seen, pulses 104 occur at a frequency related to the fluid flow rate. As indicated at 106, the frequency of pulses 104 increases during times of high flow rate. Conversely, as indicated at 108, the frequency of pulses 104 decreases as the flow rate decreases.

During times of flow pulsations or other perturbations, the frequency of pulses 104 may fluctuate quite rapidly. If the pulse rate is averaged over a time window without regard to instantaneous speed variations, then errors can occur in determining viscosity and flow rate. In contrast, controller 60 preferably determines the volumetric of fluid flow through the meter based on the instantaneous flow rate as determined by meter 10. In particular, preferred embodiments of the present invention calculate a series of instantaneous flow rates as dynamic sub-windows based upon rotor pulse duration. The series is then summed over a period of time to yield an improved volumetric flow calculation. Preferably, there may be some filtering within each sub-window filter out spurious variations.

Figure 5:
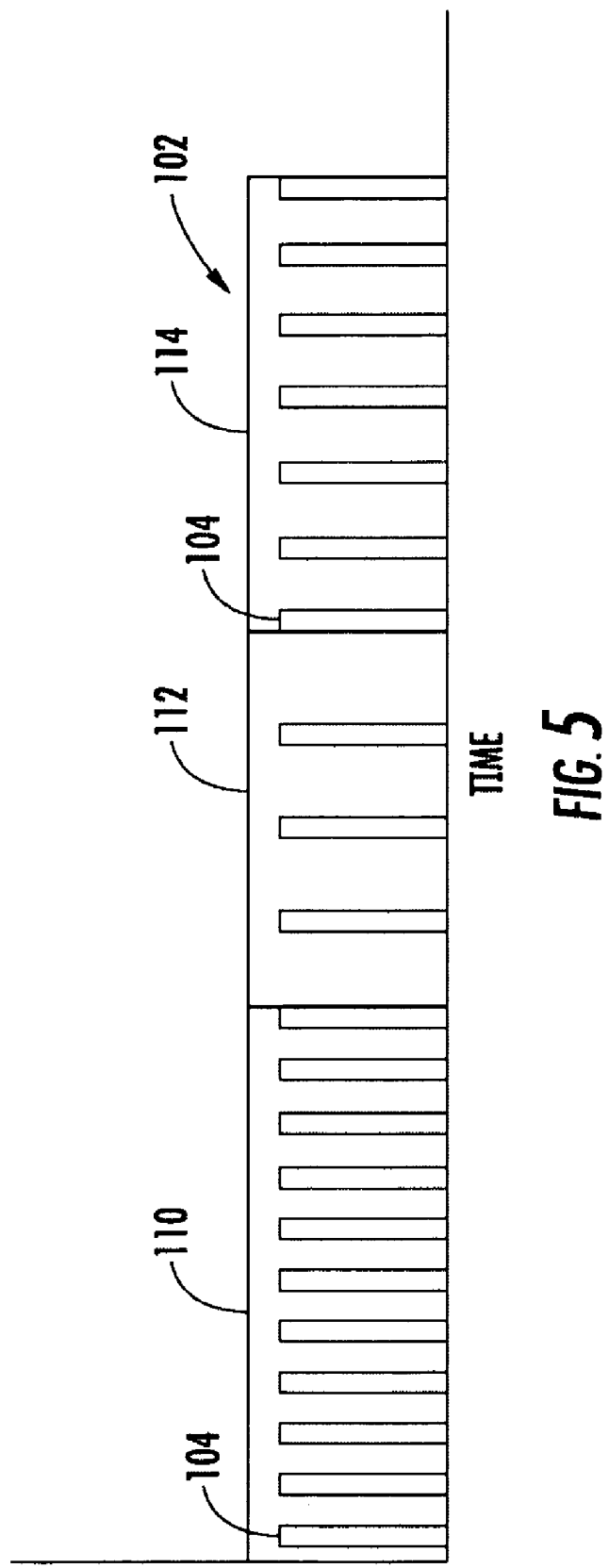
FIG. 5 is a graph illustrating dynamic time windows that may be utilized to measure accurately the time-varying flow rate illustrated in FIG. 4.

FIG. 5 illustrates one manner in which dynamic sub-windows can be created to determine volumetric in accordance with the present invention. Once the flow rate changes, either quickly due to a flow pulsation or slowly, the frequency of pulses 104 in pulse train 102 delivered to controller 60 by pulser 32 will also change. When controller 60 detects a frequency change in the pulse train, a new time window is created that captures all of pulses 104 at or near the new frequency. The new frequency is translated to a flow rate by controller 60 and multiplied by the amount of time the fluid was flowing at that rate. The volumetric flow at this new rate is then added to the previously calculated volumetric flow to ascertain the total flow through meter 10.

Therefore, depending on how often the fluid flow rate changes and the number of flow pulsations, the dynamic time windows can be of varying widths (durations). The process of determining the volumetric flow during a particular time window and adding that volume to the previously computed volume is repeated as long as fluid is flowing through meter 10. For example, FIG. 5 shows a situation in which three dynamic windows (or "sub-windows") 110, 112, 114 are created based on the varying flow rate. As can be seen, time windows 110, 112 and 113 capture the first, second, and third set of similar frequency pulses, respectively. The width (i.e., time duration) of each time window is variant to more fully capture the variations in flow rate that can occur (such as due to flow pulsations) as the fuel is dispensed.

In a preferred embodiment, dynamic time windows may include pulses of slightly differing frequencies. Within the particular sub-window, the pulse rates are averaged to filter out spurious variations such as may occur due to data acquisition errors. If the variation in pulse frequency from one pulse to the next exceeds a given threshold, however, controller 60 generates a new time window.

Figure 6:
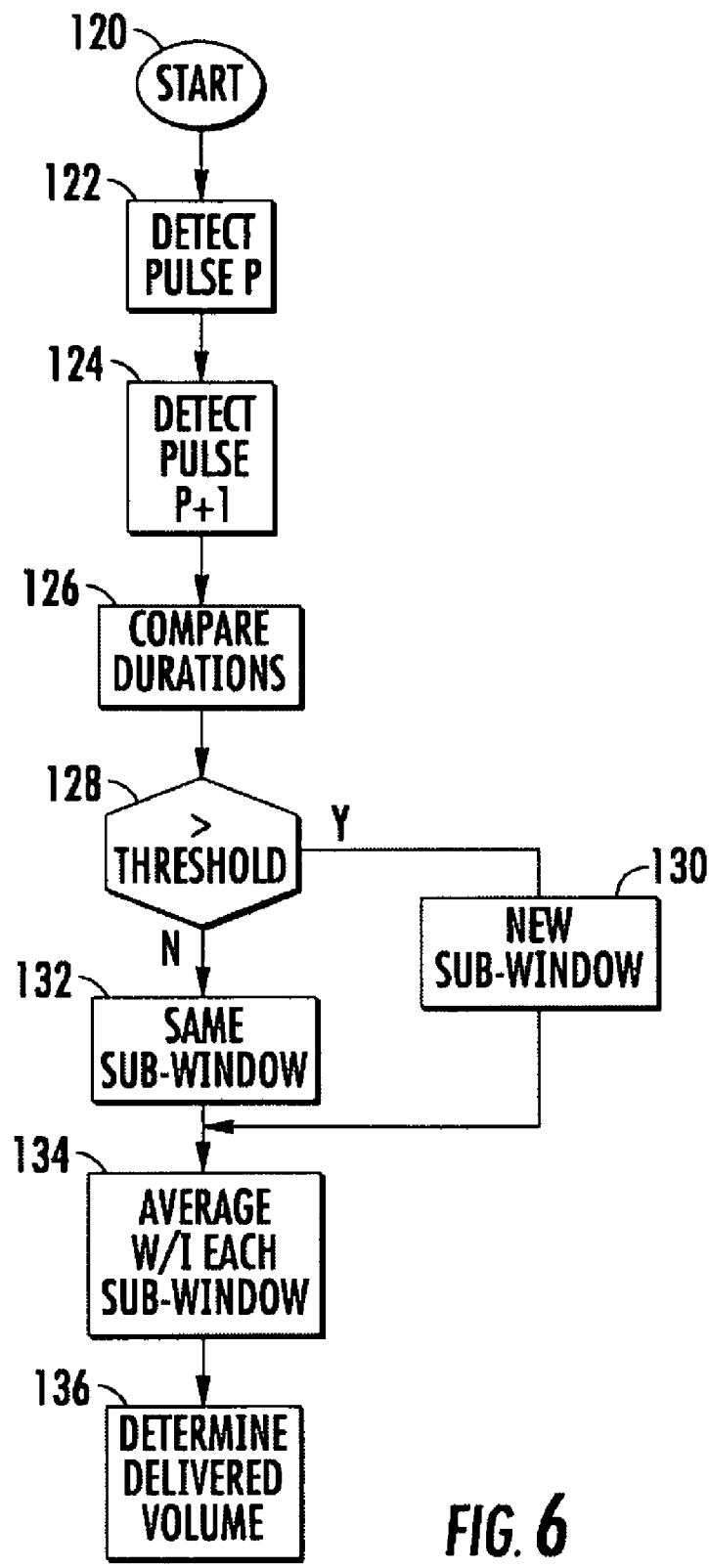
FIG. 6 is a flowchart illustrating a process for determining flow volume in accordance with the present invention.

FIG. 6 illustrates a preferred process that may be performed by controller 60 in accordance with the present invention. The process begins as indicated at 120. As indicated at 122 and 124, the process then detects successive pulses P and P+1. As indicated at 126, the duration between P and P+1 is then compared to the duration between P and the pulse before it. If the difference exceeds a certain threshold, a decision is made (as indicated at 128) to begin a new sub-window (as indicated at 130). If not, the same sub-window is continued (as indicated at 132). Within each sub-window, the pulse durations are preferably averaged (as indicated as 134) to filter out spurious variations.

Delivered volume for a specified time period can then be determined (as indicated at 136). Preferably, delivered volume will be calculated by determining the volume delivered during each sub-window making up the longer time period and adding them together. This can be expressed as:

$$\text{Delivered volume} = (DT_1 * FR_1) + (DT_2 * FR_2) + \ldots + (DT_n * FR_n)$$

Or generally:

$$\text{Delivered volume} = \text{Sum}(DT_i * FR_i)$$

Where:
DT=time duration of a sub-window
FR=flow rate during a sub-window
For sub-windows i=1 to n (total sub-windows in larger window)

It can thus be seen that the present invention provides an apparatus and method for achieving accurate determinations of delivered volume even in the presence of flow pulsations. While preferred embodiments of the invention have been shown and described, modifications and variations may be made thereto by those of ordinary skill in the art without departing from the spirit and scope of the present invention. For example, controller 60 may be separated from pulser 32 as illustrated above, or may in some cases be located adjacent to or incorporated into the pulser.

In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:
1. Apparatus for measuring fluid flow comprising:
an inferential flow meter having a housing defining a fluid flow path;
a pulser operative to produce an output signal indicative of flow rate through said meter;
a controller in electronic communication with said pulser so as to receive said output signal; and based on said output signal, said controller being operative to determine said fluid flow in a plurality of dynamic time sub-windows corresponding to respective periods of substantially consistent instantaneous flow, and to sum the fluid flow from each of the plurality of dynamic time sub-windows to compute a delivered volume of fluid.

2. Apparatus as set forth in claim 1, wherein said output signal of said pulser comprises a pulse train in which pulse frequency varies with said instantaneous flow.

3. Apparatus as set forth in claim 2, wherein said dynamic time sub-windows are ascertained by comparing duration between adjacent pulses.

4. Apparatus for measuring fluid flow comprising:
an inferential flow meter having a housing defining a fluid flow path;
a pulser operative to produce an output signal indicative of flow rate through said meter;
a controller in electronic communication with said pulser so as to receive said output signal; and
based on said output signal, said controller being operative to determine said fluid flow in a plurality of dynamic time sub-windows corresponding to respective periods of substantially consistent instantaneous flow,
wherein said output signal of said pulser comprises a pulse train in which pulse frequency varies with said instantaneous flow,
wherein said dynamic time sub-windows are ascertained by comparing duration between adjacent pulses, and
wherein said controller is operative to include a series of said adjacent pulses in one of said dynamic time sub-windows if respective durations therebetween are within a threshold of each other.

5. Apparatus as forth in claim 1, wherein said inferential flow meter is a turbine meter having at least one rotor.

6. Apparatus as set forth in claim 5, wherein said rotor rotates about a fixed shaft located in said housing.

7. Apparatus as set forth in claim 1, including a magnetic detector affixed to said housing at a location adjacent to said rotor.

8. Apparatus for measuring fluid flow comprising:
a turbine flow meter having a rotor;
a pulser operative to produce a pulse train in which pulse rate varies with instantaneous flow through said turbine flow meter;
a controller operative to determine a total volume of fluid passing through said turbine flow meter during a time period, said controller configured to perform the steps of:
(a) determining a first partial volume based on a first pulse rate during a first time sub-window;
(b) determining a second partial volume based on a second pulse rate during a second time sub-window; and
(c) adding said first partial volume and said second partial volume.

9. Apparatus as set forth in claim 8, wherein said first and second time sub-windows are dynamically determined corresponding to respective periods in which said first pulse rate and said second pulse rate remain substantially consistent.

10. Apparatus as set forth in claim 9, wherein said first pulse rate and said second pulse rate remain consistent within a predetermined threshold during said first and second time sub-windows, respectively.

11. Apparatus as set forth in claim 9, wherein said pulse rates within each of said time sub-windows are averaged during determination of said first and second partial volumes to filter out spurious variations.

12. A method of determining flow of a fluid through an inferential flow meter, said method comprising steps of:
(a) detecting a pulse train having a plurality of pulses occurring at a pulse rate indicative of fluid flow rate through said inferential flow meter;
(b) determining pulse rates of said plurality of pulses;
(c) grouping adjacent pulses having substantially consistent pulse rates into a plurality of time sub-windows;
(d) calculating respective partial volumes for each of said time sub-windows; and
(e) adding said respective partial volumes to determine a total delivered volume.

13. A method of determining flow of a fluid through an inferential flow meter, said method comprising steps of:
(a) detecting a pulse train having a plurality of pulses occurring at a pulse rate indicative of fluid flow rate through said inferential flow meter;
(b) determining pulse rates of said plurality of pulses;
(c) grouping adjacent pulses having substantially consistent pulse rates into a plurality of time sub-windows;
(d) calculating respective partial volumes for each of said time sub-windows; and
(e) adding said respective partial volumes to determine a total delivered volume,
wherein said substantially consistent pulse rates are those occurring within a predetermined threshold of each other.

14. A method as set forth in claim 12, wherein said pulse rates within each of said time sub-windows are averaged during determination of said partial volumes to filter out spurious variations.

15. A fuel dispenser comprising:
a fluid flow conduit for delivering fuel from a storage tank;
a hose having a proximal end and a distal end, said proximal end in fluid communication with said fluid flow conduit;
a nozzle connected to said distal end of said hose;
an inferential flow meter located in line said fluid flow conduit;
a pulser associated with said inferential flow meter to produce an output signal indicative of flow rate through said inferential flow meter; and
a controller in electronic communication with said pulser so as to receive said output signal; and
based on said output signal, said controller being operative to determine fluid flow in a plurality of dynamic time sub-windows corresponding to respective periods of substantially consistent instantaneous flow, and to sum the fluid flow from each of the plurality of dynamic time sub-windows to compute a delivered volume of fluid.

16. A fuel dispenser as set forth in claim 15, wherein said output signal of said pulser comprises a pulse train in which pulse frequency varies with said instantaneous flow.

17. A fuel dispenser as set forth in claim 6, wherein said dynamic time sub-windows are ascertained by comparing duration between adjacent pulses.

18. A fuel dispenser comprising:
a fluid flow conduit for delivering fuel from a storage tank;
a hose having a proximal end and a distal end, said proximal end in fluid communication with said fluid flow conduit;
a nozzle connected to said distal end of said hose;
an inferential flow meter located in line said fluid flow conduit;

a pulser associated with said inferential flow meter to produce an output signal indicative of flow rate through said inferential flow meter; and a controller in electronic communication with said pulser so as to receive said output signal; and based on said output signal, said controller being operative to determine fluid flow in a plurality of dynamic time sub-windows corresponding to respective periods of substantially consistent instantaneous flow, wherein said output signal of said pulser comprises a pulse train in which pulse frequency varies with said instantaneous flow, wherein said dynamic time sub-windows are ascertained by comparing duration between adjacent pulses, and wherein said controller is operative to include a series of said adjacent pulses in one of said dynamic time sub-windows if respective durations therebetween are within a threshold of each other.

19. A fuel dispenser as forth in claim 15, wherein said inferential flow meter is a turbine meter having at least one rotor.

20. A fuel dispenser as set forth in claim 19, wherein said rotor rotates about a fixed shaft located in a housing of said turbine meter.

21. A fuel dispenser as set forth in claim 20, including a magnetic detector affixed to said housing at a location adjacent to said rotor.

* * * * *

UNITED STATES PATENT AND TRADEMARK OFFICE
CERTIFICATE OF CORRECTION

| | |
|---|---|
| PATENT NO. | : 8,381,597 B2 |
| APPLICATION NO. | : 12/404677 |
| DATED | : February 26, 2013 |
| INVENTOR(S) | : Giovanni Carapelli |

It is certified that error appears in the above-identified patent and that said Letters Patent is hereby corrected as shown below:

In the Claims:

Column 8, line 57, Claim 17, please delete claim reference number "6" and replace with --16--.

Signed and Sealed this
Twenty-fifth Day of June, 2013

Teresa Stanek Rea
*Acting Director of the United States Patent and Trademark Office*